Feb. 1, 1944.　　　J. E. SNYDER　　　2,340,774
WRAPPER
Filed Aug. 1, 1940

Inventor
James E. Snyder

By
Attorney

Patented Feb. 1, 1944

2,340,774

UNITED STATES PATENT OFFICE 2,340,774

WRAPPER

James E. Snyder, Akron, Ohio, assignor to Wingfoot Corporation, Wilmington, Del., a corporation of Delaware Application August 1, 1940, Serial No. 349,207

2 Claims. (Cl. 229—51)

This invention relates to a cigar wrap made from rubber hydrochloride film.

In general there are two methods of packaging a cigar in a protective film. According to one method, the film is wrapped around the cigar, and a long seam is made along the length of the cigar to prevent the film from unwrapping. According to the other method a tube is made of the film, and the cigar is then inserted in the tube. Either of these methods may be employed in making the present cigar wrap. If uncoated film is used, the long seam is preferably made by heat-sealing the two plies of film together. If a coated film is used, the coating may be omitted from the portion of the film which is to form the seal and the overlapping plies may then be heat-sealed. If desired an adhesive may be employed.

Anyone familiar with cigars which have been individually wrapped in film knows that the wrap now on the market is so constructed that by squeezing the cigar at one end it pops through the seal at the other end and out the tube which forms the wrapper. Sometimes the tube opens along the long seam. The trade has been accustomed to such a wrap and to form a rubber hydrochloride wrapper for a cigar, it must be of this type to compete with those now on the market.

It is generally recognized that the most satisfactory method of uniting overlapping portions of rubber hydrochloride film is to seal the portions together by the use of heat and pressure. Such a heat-seal causes the rubber hydrochloride in the two portions of the united film to coalesce and the bond formed is in all respects substantially as strong as the film itself. Such a heat-seal is satisfactory along the long seam of a cigar wrap. However, it is not satisfactory for the seams across the ends of the cigar. It forms too strong a bond.

According to this invention, the surfaces of the rubber hydrochloride film, which are to be united to form the light seam at each end of the cigar, are treated with a material which prevents or inhibits a strong bond forming between the two plies of rubber hydrochloride film at the ends of the cigar when heat and pressure are applied. The coating may be composed largely of material which is volatilized when heat is applied to form the light bond at the ends of the cigar, or the material applied may be of a more permanent character. If the material employed is resistant to the passage of moisture vapor, the whole of the inner surface of the film may be coated with such material to improve the moisture-tightness of the package. Or, if a light seal along the long seam is desired, as well as at the ends, the inner surface of the entire wrapper may be coated.

Plasticized rubber hydrochloride film is less impervious to the passage of moisture vapor than unplasticized rubber hydrochloride film. When the cigar wrap is made of plasticized film, such a moistureproofing coating covering the whole of the inside surface of the wrap is advantageous to increase the moisture-tightness of the cigar wrap. The coating may be applied to both sides.

The materials which may be used for treating the surface of the rubber hydrochloride film where the light bond is to be formed include soap in an aqueous solution or preferably in alcohol, glycerine and water, shellac dissolved in alcohol or a resin dissolved in a suitable solvent, wax dissolved in a solvent such as gasoline, nitro cellulose or a cellulose ether dissolved in acetone or other suitable solvent, a solution of a suitable rubber derivative such as cyclized rubber, a rubber-wax mixture etc. Where gasoline or water or other solvent is used which has a deleterious effect on a cigar, the solvent should be evaporated before heat is applied to form the seam. A coating which comprises wax or both wax and cyclized rubber or a cellulose derivative or other suitable film-forming ingredient forms a moistureproofing coating which when applied over the entire inner surface of the wrap increases the moistureproofness of the wrap. Where water or other solvent is employed which does not readily wet the rubber hydrochloride surface, a light coating applied with a dauber, spray, or other instrument which spreads a light coating on the surface may be used, because it is not necessary that the surface be wet uniformly in order to prevent the formation of a strong bond between the two rubber hydrochloride surfaces.

Figure 1:
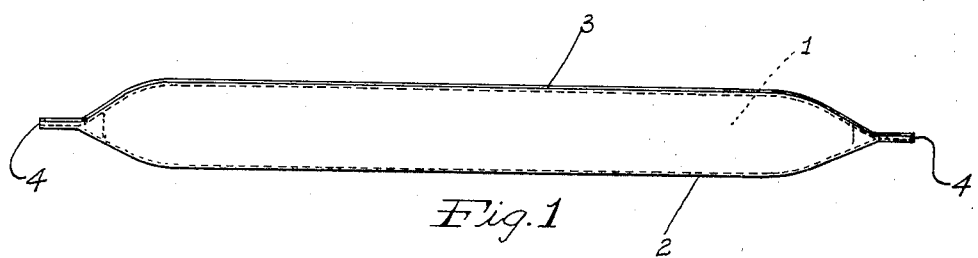
Fig. 1 is a side elevation of a wrapped cigar embodying the invention.
Figure 2:
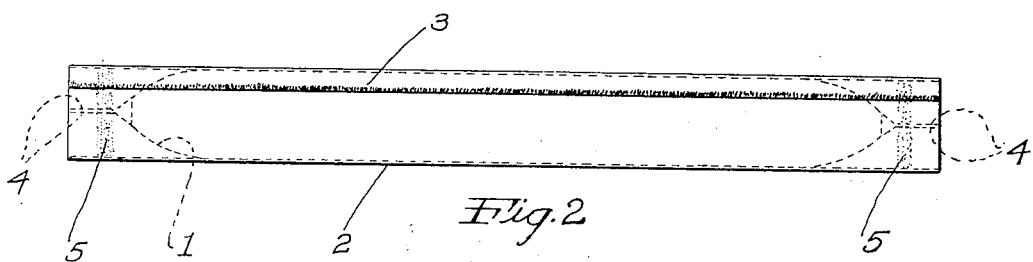
Fig. 2 is a plan view of the wrapped cigar shown in Fig. 1.

The drawing shows a cigar 1 wrapped in rubber hydrochloride film 2. The long seam 3 is made by heat-sealing the contacting plies of the rubber hydrochloride film together. The sides of the film at the ends of the cigar are tucked in to form a flat wrap at each end of the cigar which is no wider than the cigar itself. The folds formed at each end of the cigar are indicated by the numeral 4. At each end of the cigar the film is dotted over the areas 5 to indicate the presence of a coating on the interior of the film which prevents the formation of the usual strong bond between the two rubber hydrochloride surfaces when they are pressed together and heated to the heat-sealing temperature. The coating 5 does not prevent the formation of a light heat-seal at the ends of the cigar. A slight heat-seal at the ends of the cigar is an essential part of the invention. If the material applied to the film is heat-sealable, the surface of the film may be uniformly covered with it. The heat-seal may then be formed between the two surface coatings and not the film itself. When a solution is employed which includes a solvent which does not wet the surface of the film, the coating is not uniform but spotty, and the rubber hydrochloride surfaces tend to unite between the spots of the coating, but the spots prevent the formation of a strong bond between the rubber hydrochloride surfaces. When a heat-sealable, cyclized rubber is employed the cyclized rubber coatings on the opposed surfaces of film unite in forming the light heat-seal. A thin coating of the cyclized rubber known as Pliolite #P1230, manufactured by The Goodyear Tire & Rubber Company has given satisfactory results.

I claim:

1. A cigar wrap formed of rubber hydrochloride film coated on the interior at at least one end with a moistureproofing coating having poor heat-seal properties as compared with the heat-seal properties of the rubber hydrochloride film which forms a heat-seal when pressed together with heat which is more easily broken than the seal formed between the rubber hydrochloride surfaces, overlapping plies of the rubber hydrochloride film being united along the long seam, and at the ends of the cigar a seal formed by union of the coating on the film.

2. A cigar wrap formed of rubber hydrochloride film which tends to bond with itself in a heat-seal so strong as to resist ready separation, a long seam extending lengthwise of the cigar wherein opposing exposed surfaces of the film are united in a strong seal, opposing heat-sealable interiorly coated portions of the film at at least one end of the wrap coated with a material resistive to the formation between said portions of a strong heat-seal and having at most poor heat-seal properties as compared with the heat-seal properties of the film, and a relatively weak seal uniting said opposing coated portions and closing said end of the wrap adapted to be more easily broken than the seal along the long seam.

JAMES E. SNYDER.